(12) United States Patent
Miyahara

(10) Patent No.: US 8,327,580 B2
(45) Date of Patent: Dec. 11, 2012

(54) GERMINATION/GROWING APPARATUS AND PLANT CULTIVATION DEVICE

(75) Inventor: Takakazu Miyahara, Minamisatsuma (JP)

(73) Assignee: Elm Inc., Minamisatsuma (JP)

(*) Notice: Subject to any disclaimer, the term of this patent is extended or adjusted under 35 U.S.C. 154(b) by 513 days.

(21) Appl. No.: 12/597,117

(22) PCT Filed: Apr. 25, 2008

(86) PCT No.: PCT/JP2008/001106
§ 371 (c)(1),
(2), (4) Date: Oct. 22, 2009

(87) PCT Pub. No.: WO2008/136190
PCT Pub. Date: Nov. 13, 2008

(65) Prior Publication Data
US 2010/0115834 A1    May 13, 2010

(30) Foreign Application Priority Data
Apr. 27, 2007   (JP) .................................. 2007-119442

(51) Int. Cl.
*A01G 9/00* (2006.01)
(52) U.S. Cl. ............................................................ 47/60
(58) Field of Classification Search ........................ 47/60
See application file for complete search history.

(56) References Cited

U.S. PATENT DOCUMENTS

| 6,725,598 | B2* | 4/2004 | Yoneda et al. ..................... 47/60 |
| 7,278,237 | B2* | 10/2007 | Okabe et al. ....................... 47/60 |
| 7,975,429 | B2* | 7/2011 | Okabe et al. ....................... 47/61 |
| 2003/0005626 | A1 | 1/2003 | Yoneda et al. |
| 2010/0115834 | A1* | 5/2010 | Miyahara ........................ 47/65.5 |

FOREIGN PATENT DOCUMENTS

| CA | 2 392 424 A1 | 1/2003 |
| CN | 1671282 A1 | 9/2005 |
| CN | 1812708 A * | 8/2006 |
| DE | 102 30 133 A1 | 2/2003 |
| JP | U-05-088246 | 12/1993 |
| JP | U-06-009439 | 2/1994 |
| JP | A-10-178929 | 7/1998 |
| JP | A-2003-079254 | 3/2003 |
| JP | A-2003-310055 | 11/2003 |
| JP | A-2006-061126 | 3/2006 |
| KR | 2003-0005023 | 1/2003 |

OTHER PUBLICATIONS

Office Action Issued in Chinese Patent Application No. 200880013850.8, Dated Sep. 8, 2011; Applicant's IDS (Nov. 22, 2011), Citation #4.*
Office Action issued in Chinese Patent Application No. 200880013850.8 dated Sep. 8, 2011 (with translation).

* cited by examiner

*Primary Examiner* — Frank T Palo
(74) *Attorney, Agent, or Firm* — Oliff & Berridge, PLC

(57) ABSTRACT

In a germination/growing apparatus having: a heat shield chamber that can be opened and closed; an illuminator for illuminating the inside of the heat shield chamber; a temperature regulator for heating and/or cooling the inside of the heat shield chamber; and a controller for controlling the temperature regulator, whereby seeds or plants are contained in the germination/growing apparatus for germinating or growing in the heat shield chamber, a breath inspirer for inspiring a human breath to the heat shield chamber is provided. With this configuration, the concentration of the carbon dioxide in the heat shield chamber can be increased, and the growth of the plant can be promoted.

20 Claims, 7 Drawing Sheets

(a)

(b)

GERMINATION/GROWING APPARATUS AND PLANT CULTIVATION DEVICE

TECHNICAL FIELD

The present invention relates to a germination/growing apparatus and a plant cultivation device which are used to promote the germination of seeds or growth of plant bodies.

BACKGROUND ART

Kitchen gardens, in which flowers and vegetables are grown, are becoming more and more popular in Japanese homes and apartments these days. The beneficial effects of fragrance and of pets, respectively called aromatherapy and animal therapy, have been confirmed and are conventionally used in medical institutions and similar therapeutic settings. In recent years, the healing effects of growing and viewing plants, "green therapy," has also been studied and is also attracting increasing attention.

There are two ways to obtain a plant for the kitchen garden or for other use: buying a seedling; and buying a seed, germinating it, and raising the seedling oneself. Since buying a seed to germinate is troublesome and requires some skills compared to buying a seedling, beginners in particular usually buy a seedling.

Since most of the commercially available seedlings are, generally speaking, of standard breeds, seedlings of new breeds and special plants are difficult to obtain, and seedlings are more expensive than seeds, the more advanced gardeners tend to buy seeds to germinate and to raise them to full growth themselves. The problem here, however, is that seeds of plants have different optimum temperatures for germination in accordance with their kind. Pansies, for example, can bloom as early as December in eastern Japan, for which the seeds must be sown from late September to early October in order for the seeds to germinate and seedlings to grow. However, the optimum temperature for the germination of pansy seeds is between 15° C. and 20° C.: hence this period is too hot for the seeds that they are prone to perish, thus reducing their germination rate in a general environment. If the seeds are sown after November, in which the temperature reaches the optimum temperature for germination, their germination rate rises. Nevertheless, the seedlings grow slowly because of the low temperature in raising them, and it is difficult for them to bloom before the end of the year.

In the case of tropical plants, the optimum germination temperature for the bitter melon, for example, is between 25 and 35° C., and the soil temperature reaches this optimum temperature for germination after the middle of June in the east area of Japan. Since it takes approximately 60 days to raise a seedling after germination until the harvest, the harvest is started after August. In addition, since the growth rate of bitter melon quickly decreases when the temperature is under 20° C., the harvest period is limited to approximately 2.5 months, from August to the middle of October.

Nevertheless, if a plant is taken care of at an appropriate temperature during the period of the germination and of the emergence of the young seedling, it can grow after that even if the temperature is a little higher or lower than the optimum temperature. Hence, if an appropriate temperature control is performed during this period, for example, the seeds of pansy, which is suitable for low temperatures, can be sown in September to raise the seedlings so that it blooms in December. If bitter melon or other tropical plants are germinated in March through April and the seedlings are raised and settled in April through May, it is possible to start the harvest from July, which extends the harvest period by more than one month.

Given these factors, with the aim of germinating seeds and growing young seedlings at an appropriate temperature, a plurality of germination/growing apparatuses have been conventionally available in the market. These apparatuses usually comprise: a heat shield chamber capable of containing a seed or plant; means for controlling the temperature of the inside of the heat shield chamber; means for illuminating the inside of the heat shield chamber; and other portions, where seeds or plants with different optimum temperatures for germination and for raising the seedling can be germinated or grown without the influence of season and weather (for example, refer to Patent Document 1).

[Patent Document 1] Japanese Unexamined Patent Application Publication No. 2006-61126

DISCLOSURE OF THE INVENTION

Problem to be Solved by the Invention

With the aforementioned conventional germination/growing apparatuses, plants are grown in a hermetically closed heat shield chamber. Hence, the carbon dioxide in the heat shield chamber is consumed by photosynthesis until it decreases to an inadequate concentration level, causing adverse effects to the growth of the plants. In view of this, the problem to be solved by the present invention is to provide a germination/growing apparatus capable of increasing the concentration of carbon dioxide in the heat shield chamber to promote the growth of plants.

Means for Solving the Problem

To solve the above described problem, the present invention provides a germination/growing apparatus, having:
a heat shield chamber which can be opened and closed;
an illuminator for illuminating the inside of the heat shield chamber;
a temperature regulator for heating and/or cooling the inside of the heat shield chamber; and
a temperature controller for controlling the temperature regulator, whereby
the germination/growing apparatus is used for containing a seed or a plant to germinate or grow it in the heat shield chamber,
the germination/growing apparatus being characterized by comprising a breath inspirer for inspiring a human breath into the heat shield chamber.

Another form of the present invention is a plant growth device used in ordinary homes, such as a small greenhouse, warm frame, or other similar devices having a construction that a breath may be inspired to the space in which seeds or plants are contained.

That is, the plant growth device according to the present invention is a plant growth device for containing a seed or a plant to germinate or grow it, including:
a plant surrounding portion for surrounding the seed or the plant; and a breath inspirer for inspiring a human breath to the space formed by the plant surrounding portion.

Effects of the Invention

With the germination/growing apparatus according to the present invention or the plant cultivation device according to the present invention having the aforementioned configuration, carbon dioxide can be easily replenished in the heat shield chamber or the plant surrounding portion in which the concentration of carbon dioxide has decreased due to the photosynthesis of plants, whereby the adverse effects on the growth of plants due to decreased carbon dioxide can be prevented. Furthermore, by increasing the concentration of carbon dioxide in the heat shield chamber or the plant surrounding portion, the growth of plants can be promoted. Since, with the germination/growing apparatus or the plant cultivation device according to the present invention, the concentration of carbon dioxide in the heat shield chamber or the plant surrounding portion can be increased without using a cumbersome mechanism, the size of the apparatus or the device can be minimized and no significant increase in the manufacturing cost occurs, which makes an inexpensive and compact device suitable for use in ordinary homes.

EXPLANATION OF NUMERALS

11 . . . Heat Shield Chamber
15 . . . Illumination
16 . . . Power Supply
17 . . . Control Unit
18 . . . Electrical Component Housing
19 . . . Temperature Control Unit
20 . . . Heat Exchanger
21 . . . Temperature Sensor
22 . . . Operation Unit
23 . . . Display
30 . . . Breath Inlet
31, 32 . . . Valve
33 . . . Slit
34 . . . Stopper
40 . . . Seed Tray
50 . . . Seedling Tray
60 . . . Shelf
70 . . . Plant
101 . . . Frame
102 . . . Glass Plate
102a . . . Door
201 . . . Main Body
202 . . . Supporter
203 . . . Cover

BEST MODE FOR CARRYING OUT THE INVENTION

With the germination/growing apparatus and the plant cultivation device according to the present invention, carbon dioxide is replenished into the heat shield chamber or the plant surrounding portion with human breath. Since plants assimilate carbon dioxide in the atmosphere to create carbohydrates by photosynthesis for their growth, if the heat shield chamber or the like is hermetically closed for a long time, the concentration of carbon dioxide inside thereof gradually decreases. The concentration of carbon dioxide in the normal atmosphere is approximately 350 ppm, and if the concentration is not more than 200 ppm, some plants seriously fail to grow. On the other hand, plants vigorously grow under the concentration of 350 ppm and thicker, and it is said that carbon dioxide concentration of approximately between 400 and 3000 ppm is effective for promoting the growth of plants.

Figure 14:
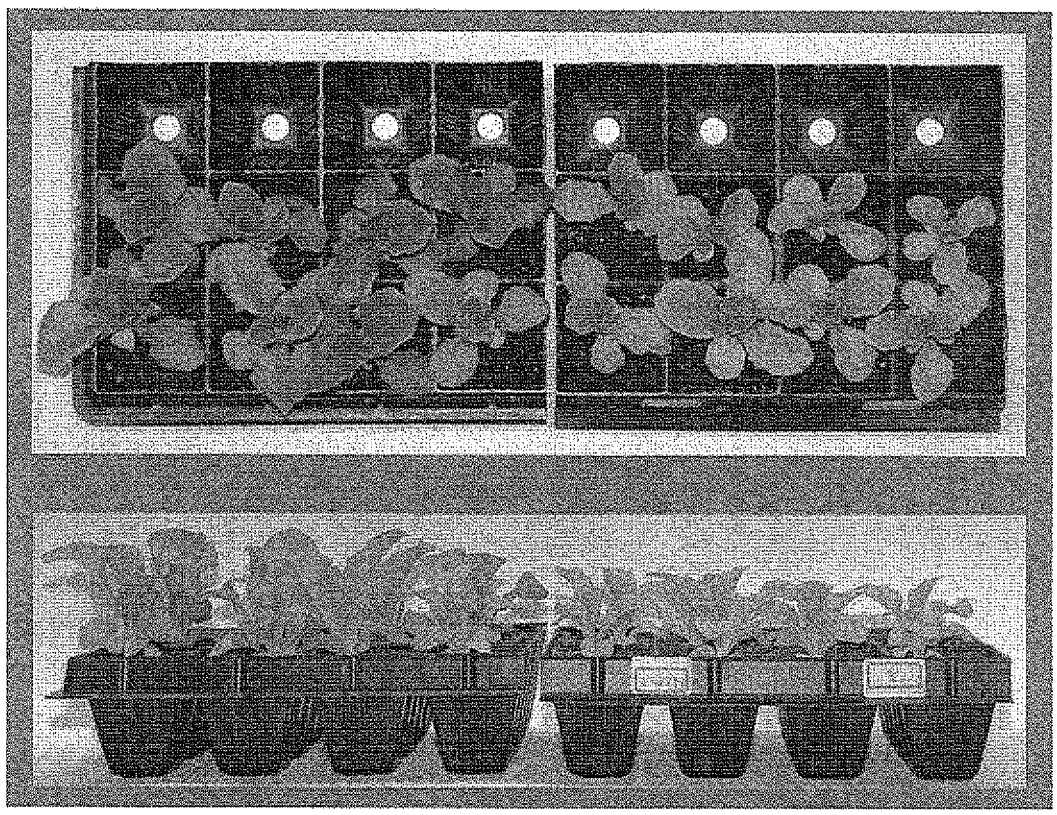
FIG. 14 are photographs showing the difference in the growth of plants by the addition of $CO_2$.

The result of a cultivation experiment to confirm the effect of the supply of carbon dioxide on the growth of plants is shown in FIG. 14. In the left four columns of the picture are seedlings of "Chima Sanchu" (or Korean lettuce) grown under the environment in which carbon dioxide was supplied with the concentration maintained at 1500 ppm, and in the right four columns are seedlings of "Chima Sanchu" (or Korean lettuce) grown without supplying carbon dioxide. For both groups of seedlings, the growing condition other than the carbon dioxide concentration was set to be the same. As is clear from the figure, the seedlings of the group to which carbon dioxide was supplied grew bigger than those of the other group. In addition, although the leaves of the seedlings of the group to which carbon dioxide was not supplied had a yellow tinge, the leaves of the seedlings of the group to which carbon dioxide was supplied were deep green.

As just described, increasing the concentration of carbon dioxide in the heat shield chamber or the plant surrounding portion is effective in promoting the growth of plants. Since human breath contains a few percent of carbon dioxide, the concentration of carbon dioxide in the heat shield chamber can be easily increased by blowing breath into the heat shield chamber or the plant surrounding portion. This also brings about an effect that a user feels satisfied since the user's own breath can promote the growth of plants.

Any device can be used for the temperature regulator in the germination/growing apparatus according to the present invention. For example, the combination of a heater type warmer and a compressor type cooler, or other devices can be used. Preferably, in order to achieve the downsizing of the apparatus and the reduction of the cost, the temperature regulator may be composed of a Peltier element. In addition, it is preferable to provide an agitator fan for circulating the air in the heat shield chamber. Of course, without using such a machine, the air can be circulated by natural convection.

As the illuminator, a fluorescent lamp, halogen lamp, or other types of lamp can be used, although it is preferable to use a light-emitting diode (LED) which is energy-efficient and capable of supplying the light of the wavelength necessary for the growth of plants. In addition to the illumination for growing plants, an observation illumination for allowing the user to observe the inside of the chamber can be separately provided. In this case, as the illumination for growing plants, an LED having the wavelength suitable for the growth of the plants may be preferably used; and as the observation illumination, an illumination among fluorescent lamps and LEDs having a high color rendering index, with which the color of plants and flowers can be naturally seen, may be preferably used. It is also preferable for the plant growing illumination and the observation illumination to be independently controlled; and the observation illumination is normally off, while the user can arbitrarily turn it ON to observe the inside of the chamber.

The germination/growing apparatus according to the present invention may preferably have a humidifier such as an ultrasonic humidifier, steam humidifier, or other types of humidifier. Preferably, it may further have a humidity sensor in order to maintain the humidity of the inside of the heat shield chamber at a predetermined level.

The germination/growing apparatus according to the present invention may preferably have a water supplier for the seed or plant. The water supplier may be composed of, for example: a water storage tank; a water supply pump; a leading piping for leading water from the water storage tank to the heat shield chamber; and a supply piping for supplying the water introduced to the heat shield chamber to the seed or plant. Alternatively, the water storage tank may be placed above the heat shield chamber so that water is supplied by its own weight. In this case, a valve for opening and closing the leading piping or the supply piping is provided in place of the water supply pump, Preferably, the germination/growing apparatus according to the present invention, may further include:

a timer for obtaining time information;

a setting means for allowing the user to set one or plural time points and a control condition corresponding to each of the time points; and a controller for controlling, based on the control condition or conditions set by the setting means, at least one among the temperature controller, the illuminator, the humidifier, and the water supplier.

With such a configuration, a variety of control conditions can be automatically changed in accordance with time. For example, turning ON and OFF the illuminator at a predetermined turn-ON time or turn-OFF time, changing the temperature or humidity inside the heat shield chamber according to the time within a day, supplying water to plants or seeds at a specified time, and other actions can be automatically performed. This can considerably save various handworks and cares required for germinating or growing the plants.

In general, plants receive sunlight in the daytime to photosynthesize, and at night, they consume the energy generated by the photosynthesis. The photosynthesis becomes active at a higher temperature, and the energy consumption at night decreases as the temperature is lowered. Given these factors, the temperature in the heat shield chamber can be set so that the inside temperature of the heat shield chamber in the daytime (i.e. from the turn-ON time to the turn-OFF time) and that at night (i.e. from the turn-OFF time to the turn-ON time) are respectively optimum for the plants, by appropriately controlling the illuminator and the temperature controller with the controller.

In the germination/growing apparatus according to the present invention, the control patterns composed of one or plural time points and a control condition corresponding to each of the time points as previously described may be set for a plurality of days. In this case, the control conditions can be changed within a day, and further the time points and/or the control condition at each time points can be changed in accordance with the progress of days. This enables a control, for example, in which the illumination is kept OFF for the first few days from the seeding, and, after the seeds begin to germinate, the illumination is turned ON and the length of the illuminating time is gradually increased. A further complicated control can be automatically performed, such as: maintaining a relatively low temperature all day for a few days just after the seeding, followed by maintaining a relatively high temperature all day, and, when the seeds germinate to become seedlings, maintaining a higher temperature in the daytime and a lower temperature at night. Of course, just as the combination of the illumination control and the temperature control described above can be performed, and the control of the humidifier or the water supplier can also be additionally combined. Furthermore, by setting a control pattern for one year, a natural climate over a year can be reproduced in the heat shield chamber.

The germination/growing apparatus according to the present invention may preferably include:

a timer for obtaining time information;

a memory in which the plurality of control patterns as previously described are stored;

a selector for allowing a user to select an appropriate control pattern among the plurality of control patterns; and a controller for reading out the selected control pattern from the memory, and controlling, in accordance with the control pattern, at least one among the temperature controller, the illuminator, the humidifier, and the water supplier.

Owing to this configuration, by storing many control patterns beforehand suitable for germinating and/or growing various plants, control patterns corresponding to the climate of typical areas in the world, and other control patterns, for example, the user can easily set a complicated control work by just selecting a control pattern corresponding to the kind of the target plant or the growing area thereof. The "areas" here may be, for example, the names of principal cities, the climatic classifications (e.g. a tropical rainforest climate and an alpine climate), etc. The "climate" means one or plural natural conditions as a whole including the sunshine, temperature, rainfall, humidity, and other conditions.

Highland orchids and alpine plants prefer a cold climate and require a temperature difference between day and night; hence it has been conventionally difficult to cultivate them in an ordinary room or greenhouse. However, with the aforementioned configuration, since the climate over a year such as the sunshine and temperature in the growing area of the target plant for example can be easily reproduced in the heat shield chamber, the plants which have been conventionally difficult to grow can be easily grown for a long time. Therefore, by using the germination/growing apparatus according to the present invention, the plants difficult for general plantsmen and women to grow can be grown in an ordinary room or other places. This can bring about an emotional superiority to the user and is also effective for increasing the spiritual healing effects and activation effects.

The germination/growing apparatus according to the present invention may have a reader, in place of the memory and the selector, for reading a control pattern stored in a predetermined storage media such as a memory card. With this configuration, by just inserting a memory card or the like in which an appropriate control pattern is stored to the card slot or other interface port provided in the germination/growing apparatus, for example, it is possible to perform the control in accordance with the control pattern.

FIRST EMBODIMENT

Figure 1:
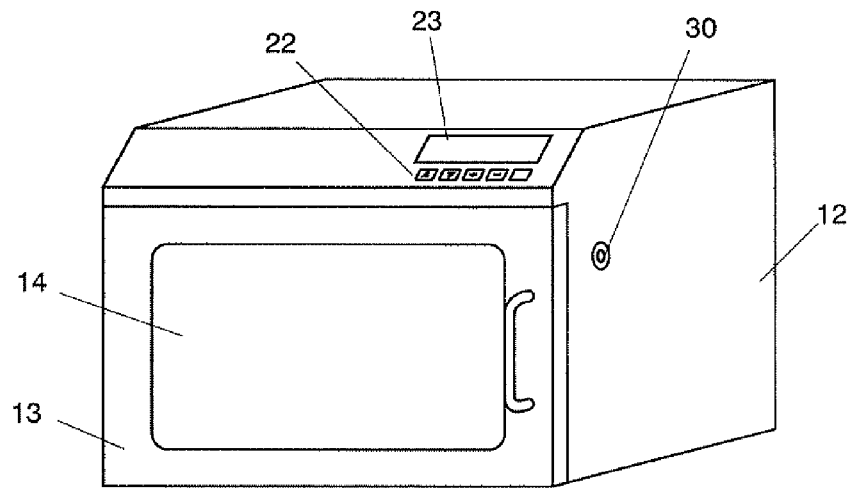
FIG. 1 is a perspective view of a germination/growing apparatus according to the first embodiment of the present invention with the door closed.
Figure 2:
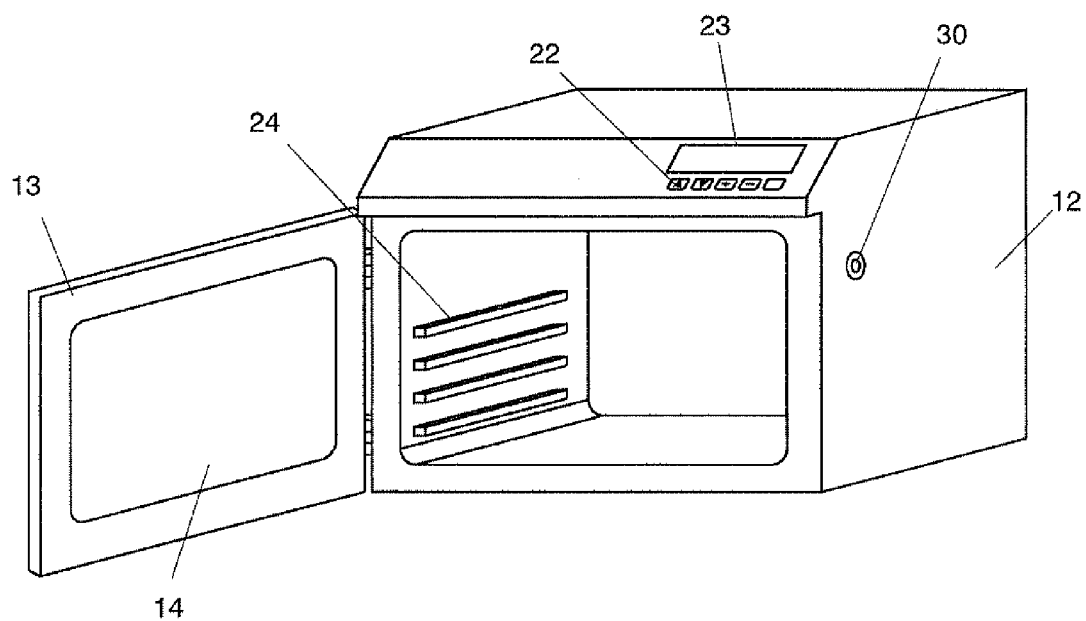
FIG. 2 is a perspective view of the germination/growing apparatus according to the same embodiment with the door open.
Figure 3:
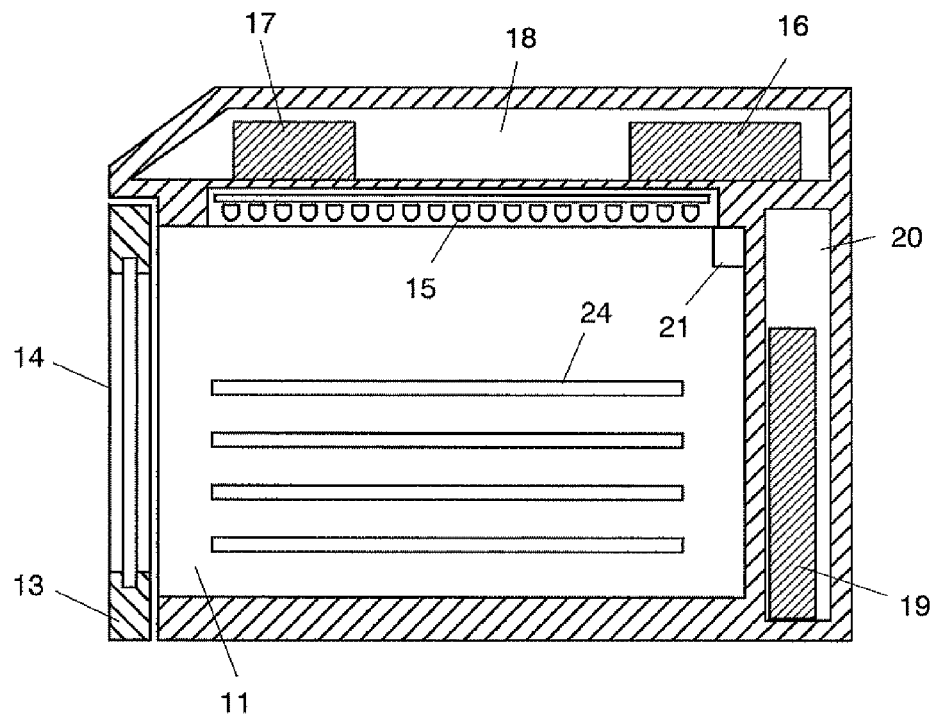
FIG. 3 is a longitudinal sectional view for explaining the internal structure of the germination/growing apparatus according to the same embodiment.
Figure 4:
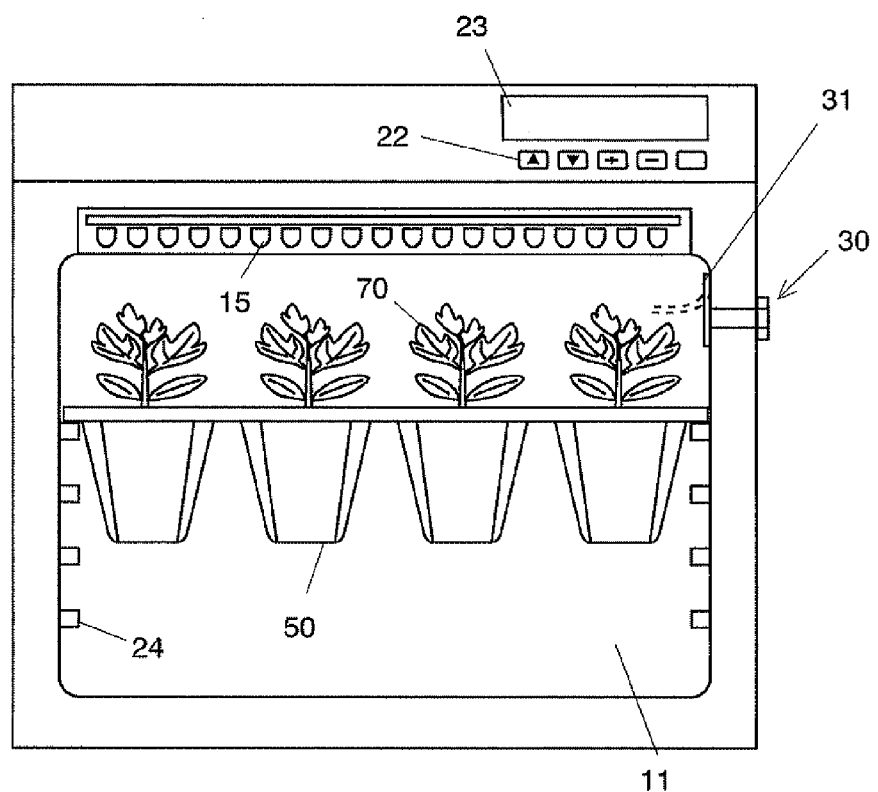
FIG. 4 is a front view for explaining the structure of the inside of the heat shield chamber of the germination/growing apparatus according to the same embodiment.

Hereinafter, an embodiment of the germination/growing apparatus according to the present invention will be described with reference to the attached drawings. FIGS. 1 and 2 are perspective views of the germination/growing apparatus of the present embodiment. FIG. 3 is a longitudinal sectional view showing the internal structure of the germination/growing apparatus according to the present embodiment, and FIG. 4 is a front view for explaining the structure of the inside of the germination/growing apparatus according to the present embodiment.

The germination/growing apparatus according to the present embodiment includes a main body 12 with a heat shield chamber 11 for containing plants, and a door 13 of the heat shield chamber 11. An observation window 14 of a transparent glass or resin is provided in the door 13 for observing the inside of the heat shield chamber 11. The observation window 14 may be provided on the main body 12, instead of in the door 13, and altogether it is not indispensable in the present apparatus. In constructing the observation window 14, it is preferable to adopt a heat-insulation structure with double glass panes or double transparent resin panes in order to prevent dew condensation. The form of the germination/growing apparatus is not limited to those illustrated in FIGS. 1 though 4, and can be any form, provided that the apparatus has a main body; and a door, cover, or drawer for opening and closing the main body.

Figure 8:
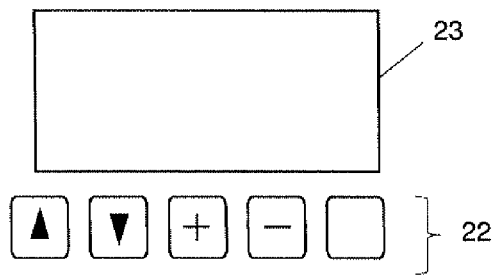
FIG. 8 is an enlarged view showing the operation unit and the display of the germination/growing apparatus according to the same embodiment.

On the ceiling of the heat shield chamber 11 is provided an LED illumination 1.5. Above the illumination 15 is provided an electrical room 18 in which a power supply 16, control unit 17, electronic clock (not shown), and other electric devices are contained. At the back of the heat shield chamber 11 is provided a heat exchanger 20 in which a temperature control unit 19 is contained, where the temperature control unit 19 is composed of a Peltier element for warming or cooling the inside of the heat shield chamber 11, a fan for agitating the heat, and other parts. Inside the heat shield chamber 11 is provided a temperature sensor 21 for detecting the temperature of the inside of the chamber. On top of the heat shield chamber 11, as illustrated in FIG. 8, an operation unit 22 with operation buttons for allowing the user to input a variety of settings and a display 23 for showing the time and a variety of information are provided.

The control unit 17 is made of a microcomputer including a central processing unit (CPU), read only memory (ROM), random access memory (RAM), and other elements, and controls the operation of the illumination 15, the temperature control unit 19, and other components. To the control unit 17 are connected the electronic clock, the operation unit 22, the display 23, the temperature sensor 21, and other units. A control program is stored in the ROM of the microcomputer, and a variety of operations as will be described later are carried out when the CPU executes the control program in accordance with the control condition provided from the operation unit 22. It should be noted that the position of the electrical room 18 and the heat exchanger 20 is one example, and both of them can be placed on top of or at the back of the heat shield chamber 11.

On the left and right walls inside the heat shield chamber 11 are provided a plurality of tray supporter 24 for supporting a seed tray 40 and a seedling tray 50. Therewith, the distance between the illumination 15 and the plant 70 can be adjusted in accordance with the growing stage of the plant. In FIG. 4, for example, the plants 70 are shown as young seedlings, and as the plants 70 grow, the tray 50 may be moved to lower tray supporters 24 in order to keep an appropriate distance between the plants 70 and the illumination 15. Since strong light is not necessary at the germination stage of seeds, the seed tray 40 or the like may be placed on the lowest level so that seeds are germinated on the lower levels while seedlings are raised on the upper levels. Alternatively, a plurality of seed trays 40 can be set to simultaneously geminate a large number of seeds. In the drawing, protruding rails are used as the tray supporter 24. Instead of this, channel rails, round pins, or the combination of these can be used.

Figure 9:
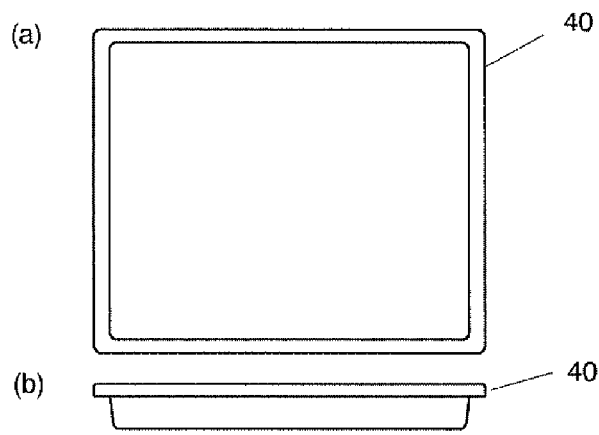
FIG. 9(a) is a top view showing an example of the seed tray used in the germination/growing apparatus according to the same embodiment.
FIG. 9(b) is a front view of the same.
Figure 10:
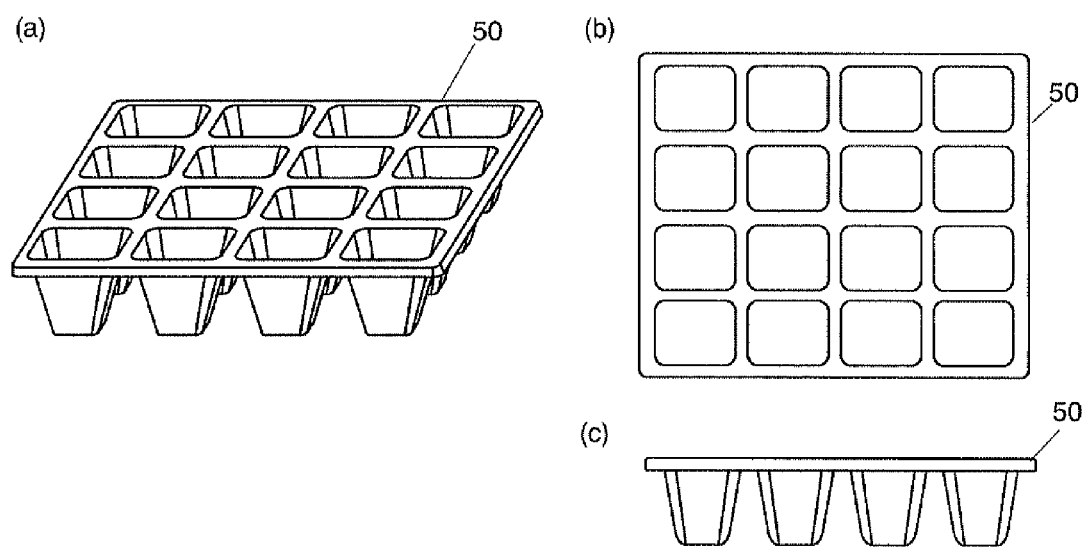
FIG. 10(a) is a perspective view showing an example of the seedling tray used in the germination/growing apparatus according to the same embodiment.
FIG. 10(b) is a top view of the same.
FIG. 10(e) is a front view of the same.
Figure 11:
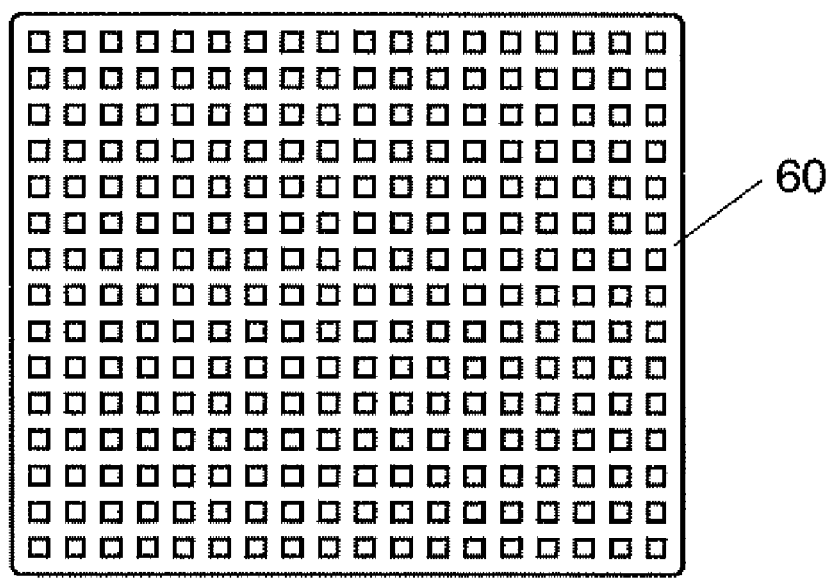
FIG. 11(a) is a top view showing an example of the shelf used in the germination/growing apparatus according to the same embodiment.
FIG. 11(b) is a front view of the same.
Figure 11:

FIGS. 9 and 10 show examples of the seed tray 40 and the seedling tray 50. In these trays, soil, culture medium, or the like are contained to sow seeds and plant seedlings. Their size is set to be the same as or a little smaller than the inner size of the heat shield chamber 11. For growing plants 70, instead of using such a dedicated tray, a commercially available seed tray, seedling tray, seedling pot, or other container can be used. In these cases, a plane shelf 60 is first placed on the tray supporter 24, and the commercially available seed trays and pots are placed on the shelf 60. FIG. 11 shows an example of such a plane shelf 60. The shelf 60 is preferably made of a transparent material so that an illumination light can pass, and it is preferable to be a mesh type so that the illumination light and air can pass.

Figure 5:
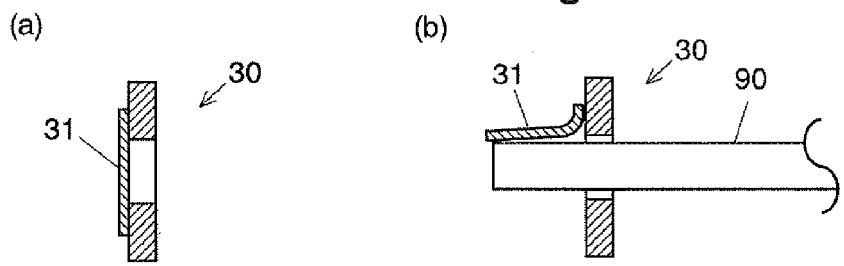
FIG. 5(a) is a sectional view showing the structure of the breath inlet of the germination/growing apparatus according to the same embodiment without a tubular member inserted.
FIG. 5(b) is the same view with a tubular member inserted.

The germination/growing apparatus according to the present embodiment has a breath inlet 30 for inspiring a human breath to the inside of the heat shield chamber 11, and by appropriately blowing the breath from the breath inlet 30 into the heat shield chamber 11 by the user, the concentration of the carbon dioxide in the chamber can be increased. The structure of the breath inlet 30 is shown in FIG. 5. The breath inlet 30 is an hole provided on a side of the main body 12 opening to the inside of the heat shield chamber 11. The user inserts a tubular member 90 such as a straw from the breath inlet 30 into the heat shield chamber 11 to blow the breath. On the side of the heat shield chamber 11 of the breath inlet 30 is provided a valve 31 made of a flexible sheet, which closes the hole of the breath inlet 30 when the tubular member 90 is not inserted as shown in FIG. 5(*a*), and bends when the tubular member 90 is inserted as shown in FIG. 5(*b*), so that the tubular member 90 can enter the heat shield chamber 11.

Figure 6:
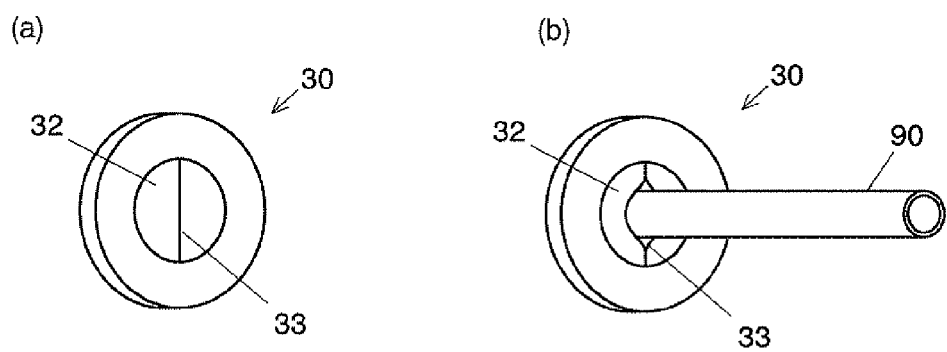
FIG. 6(a) is a perspective view showing another example of the breath inlet without a tubular member inserted.
FIG. 6(b) is the same view with a tubular member inserted.
Figure 7:
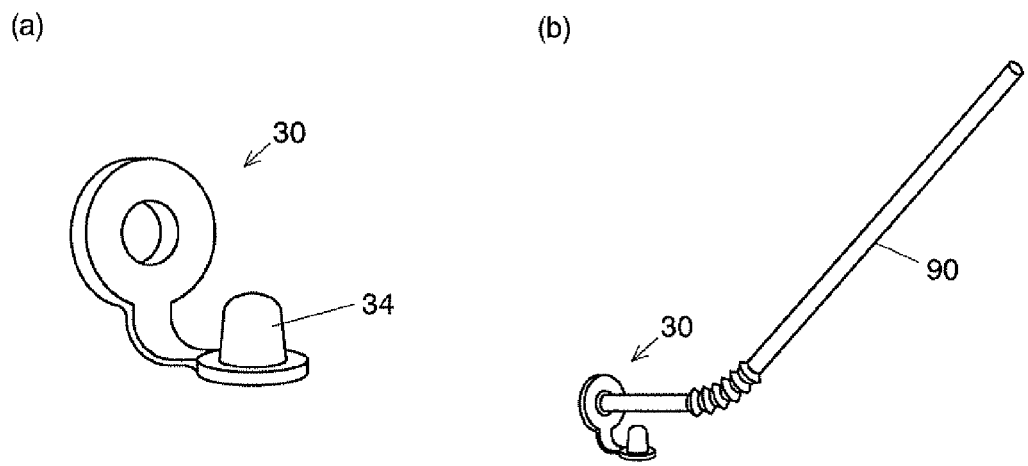
FIG. 7(a) is a perspective view showing another example of the breath inlet with a stopper removed.
FIG. 7(b) is the same view with a tubular member inserted.

The configuration of the valve 31 and the breath inlet is just an example, and a variety of other configurations can be used, such as: providing a pipe nipple in the breath inlet 30, and a tube or the like is connected to the pipe nipple to blow the breath, or blowing breath directly to the nipple. A variety of structures of the valve can be used; for example, as shown in FIG. 6, a slit 33 that opens when a tube 90 is inserted can be used. In this example, the valve 32 is made of a thin film of elastic material such as a synthetic resin or rubber. When a tube 90 such as a straw is inserted, the slit 33 opens elastically, and when the tubular member 90 is removed, the slit 33 closes. Since the breath inlet 30 is a relatively small aperture, such a valve is not indispensable; a detachable stopper 34 as shown in FIG. 7 or a removable cap may be used. Although the breath inlet 30 is provided on the side of the main body 12 in this embodiment, the position of the breath inlet 30 can be arbitrarily set, such as on top of the main body 12 and on the door 13.

The germination/growing apparatus according to the present invention can automatically control the temperature and sunshine in the heat shield chamber 11 by the control unit 17. Hereinafter, the control of the temperature and sunshine in the germination/growing apparatus according to the present invention will be described.

First, the user operates the buttons of the operation unit 22 to specify the control condition for controlling the temperature control unit 19 and the illumination 15. In this operation, for example, by specifying one temperature condition or illumination condition, it is possible to control the temperature control unit 19 in such a manner as to always maintain the inside of the heat shield chamber 11 at a constant temperature, or as to always keep the illumination 15 ON or OFF. It is also possible to set that the preset temperature and ON/OFF of the illumination 15 are changed according to the time of the day. In this case, for example, the user specifies the first time point T1 and the second time point T2 on the operation unit 22, and inputs a temperature and illumination condition (ON or OFF) at the time point T1 as the first control condition, and another temperature and illumination condition at the time point T2 as the second control condition. Accordingly, the illumination 15 and the temperature control unit 19 are controlled under the first control condition from the time point T1 to the time point T2, and controlled under the second control condition from the time point T2 to the time point T1 of the next day. The number of specified time points can be more than two, and change of temperature and change of illumination ON/OFF may be set to be made at different time points.

In the microcomputer of the control unit 17 are stored plural control patterns composed of one or plural time points and a control condition corresponding to each time point. Each of the control patterns is assigned a unique identification code (e.g. three-digit number), and the user enters a desired identification code on the operation unit 22, so that an appropriate control pattern can be read and executed. In this case, the user can know the identification code corresponding to a desired control pattern by referring to a reference table described in the instruction manual attached to the apparatus. Preferably, the control patterns are factory-installed in the microcomputer. In addition to this, it is more preferable that the user himself or herself is allowed to make a control pattern, assign an appropriate identification code, and store it in the memory.

The control patterns described above may be, for example, those suitable for germinating and/or growing a variety of plants, and those corresponding to the annual climate of a plurality of areas in the world. With this configuration, by controlling the illumination 15 and the temperature control unit 19 in accordance with the control condition that the user has chosen, the annual climate of the place of origin of the target plant, for example, can be easily recreated in the heat shield chamber 11. This makes it possible to cultivate highland orchids and alpine plants which were conventionally difficult to grow due to the difficult temperature and sunshine conditions.

Another configuration is possible in which a variety of control patterns and the corresponding names are stored in the microcomputer, and the list of the names are displayed on the display 23 to allow the user to choose. In this case, for example, the following operation is possible: the user performs a predetermined operation on the operation unit 22, so that the names of control patterns (e.g. low temperature, mild temperature, high temperature, etc.) for germinating seeds are shown on the display 23. Then the user selects an appropriate name among them, so that the control patterns for a predetermined number of days (several days to several weeks) in accordance with the germination condition of the target plant are read out and executed.

The germination/growing apparatus according to the present invention was described so far using an embodiment. It should be noted that the present invention is not limited to the aforementioned embodiment, and appropriate modifications are possible within the scope of the present invention. For example, the germination/growing apparatus according to the present invention may include, in addition to the temperature controller and the illuminator as in the aforementioned embodiment, means for regulating the humidity and/or a water supplier for supplying water to the seed or the plant. This enables the recreation of not only the temperature and sunshine of the specified area but also the humidity and/or the rainfall of this area in the heat shield chamber, making it possible to cultivate difficult plants in an environment close to their habitat.

The water supplier can be composed of: a water storage tank; a water supply pump; a leading piping for leading water from the water storage tank to the heat shield chamber; and a supply piping for supplying water introduced to the heat shield chamber to the soil or culture medium in which seeds or plants are planted. Preferably, the supply piping is made of a flexible tube, and a device for fixing the end of the supply piping to the soil or culture medium, or to the tray, pot, or other containers in which the soil or culture medium may be further provided.

SECOND EMBODIMENT

Figure 12:
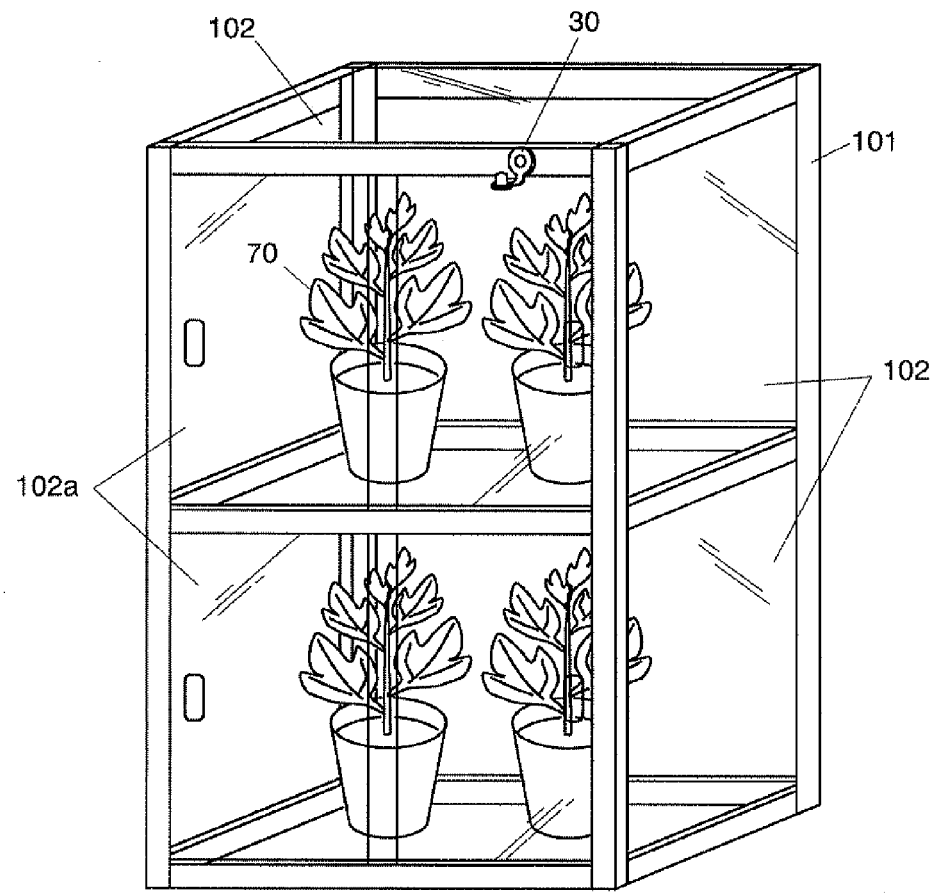
FIG. 12 is a perspective view showing the plant cultivation device according to the second embodiment of the present invention.

Next, an embodiment of the plant cultivation device according to the present invention will be described with reference to FIGS. 12 and 13. FIG. 12 shows an indoor small greenhouse, which is generally called a Wardian case, with a breath inlet 30 for inspiring a human breath, and FIG. 13 shows a small frame for covering plants to keep the heat inside equipped with a breath inlet 30.

The small greenhouse of FIG. 12 is composed of a frame 101 made of aluminum or other material and glass plates 102 adapted in the frame 101. A part of the glass plates 102 are horizontally slidable so that they can act as doors 102a for entering the plant 70. The inside of the frame 101 are almost airtight when the doors 102a are closed, and on the frame 101 is provided a breath inlet 30 for blowing the breath to the airtight space inside. The breath inlet 30 is an aperture communicating to the inside of the greenhouse, and the user inserts a tube, such as a straw, from the breath inlet 30 into the greenhouse to blow the breath in it. The configuration of the breath inlet 30 is not limited to those shown in FIGS. 5 through 7, but a variety of other configurations can be adopted. As the means for inspiring breath, a small window or the like may be provided separately from the doors 102a for entering plants. The airtight space may be formed with hard transparent resin plates or with soft transparent sheets, in place of the glass plates 102.

Assuming that the inner dimensions of the small greenhouse of FIG. 12 are 1 m height, 1 m width, and 40 cm depth, for example, the internal volume is 400 liters. Meanwhile, human breath contains approximately 3% of carbon dioxide, and the volume of a deep exhale is approximately three liters. Hence, blowing the breath with the volume of three liters and 3% concentration of carbon dioxide to the 400 liter internal volume of the small greenhouse increases the carbon dioxide concentration to approximately 525 ppm by one inspiration, to 750 ppm by two, to 975 ppm by three, to 1200 ppm by four, and to 1425 ppm by five. This shows that the optimum carbon dioxide concentration for the growth of plants, as previously described, can be achieved with several times of breath inspiration.

Figure 13:
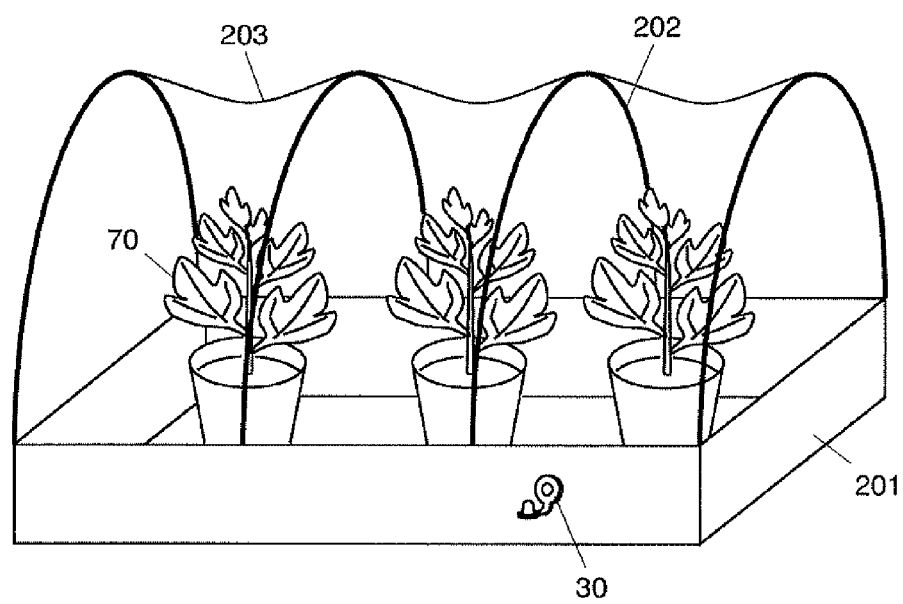
FIG. 13 is a perspective view showing another configuration of the plant cultivation device of the same embodiment.

The small frame in FIG. 13 is composed of: a box-shaped main body 201; several supporting arches 202 attached to the main body 201; and a cover 203 made of a soft resin film supported by the supporting arches 202. On a side of the main body 201, a breath inlet 30 same as previously described is provided. The space formed by the main body 201 and the cover 203, in which plants 70 are contained, is kept airtight so that the breath inspired from the breath inlet 30 does not easily leak out. A heater such as a joule heater may be provided in the small frame.

The invention claimed is:

1. A germination/growing apparatus for kitchen gardens comprising:
   a heat shield chamber which can be opened and closed;
   a breath inlet for receiving a human breath into the heat shield chamber, the breath inlet configured to be closed except when the human breath is applied to the breath inlet:
   an illuminator for illuminating an inside of the heat shield chamber;
   a temperature regulator for heating and/or cooling the inside of the heat shield chamber; and
   a temperature controller for controlling the temperature regulator, whereby
   the germination/growing apparatus is used for containing a seed or a plant to germinate or grow the seed or the plant in the heat shield chamber.

2. The germination/growing apparatus according to claim 1, wherein:
   the illuminator comprises a plant growing illumination for supplying a light necessary for the plant to grow and an observation illumination for illuminating the plant when a user observes the inside of the heat shield chamber, and the plant growing illumination and the observation illumination can be individually controlled.

3. The germination/growing apparatus according to claim 2, further comprising a water supplier for supplying water to the seed or the plant.

4. The germination/growing apparatus according to claim 2, further comprising a humidifier for humidifying the inside of the heat shield chamber.

5. The germination/growing apparatus according to claim 1, further comprising a humidifier for humidifying the inside of the heat shield chamber.

6. The germination/growing apparatus according to claim 5, further comprising a water supplier for supplying water to the seed or the plant.

7. The germination/growing apparatus according to claim 5, further comprising a humidity sensor in order to maintain a humidity of the inside of the heat shield chamber at a predetermined level by the humidifier.

8. The germination/growing apparatus according to claim 1, further comprising a water supplier for supplying water to the seed or the plant.

9. The germination/growing apparatus according to claim 8, wherein the water supplier comprises:
   a water storage tank;
   a water supply pump;
   a leading piping for leading the water from the water storage tank to the heat shield chamber; and
   a supply piping for supplying the water introduced to the heat shield chamber to the seed or the plant.

10. The germination/growing apparatus according to claim 1, further comprising:
    a timer for obtaining time information;
    setting means for allowing a user to set one or plural time points and a control condition corresponding to each of the time points; and
    a controller for controlling, based on the control condition or conditions set by the setting means, at least one of the temperature controller and the illuminator.

11. The germination/growing apparatus according to claim 1, further comprising:
    a timer for obtaining time information;
    a memory configured to store a plurality of control patterns composed of one or plural time points and a control condition corresponding to each of the time points;
    a selector for allowing a user to select an appropriate control pattern among the plurality of control patterns; and
    a controller for reading out the selected control pattern from the memory, and controlling, in accordance with the control pattern, at least one of the temperature controller and the illuminator.

12. The germination/growing apparatus according to claim 11, comprising a reader, in place of the memory and the selector, for reading a control pattern stored in a storage media.

13. The germination/growing apparatus according to claim 1, further comprising an agitator fan for agitating an air in the heat shield chamber.

14. The germination/growing apparatus according to claim 1, further comprising:
    a humidifier for humidifying the inside of the heat shield chamber;
    a water supplier for supplying water to the seed or the plant;
    a timer for obtaining time information;
    setting means for allowing a user to set one or plural time points and a control condition corresponding to each of the time points; and
    a controller for controlling, based on the control condition or conditions set by the setting means, at least one among the temperature controller, the illuminator, the humidifier, and the water supplier.

15. The germination/growing apparatus according to claim 14, wherein:
    the illuminator comprises a plant growing illumination for supplying a light necessary for the plant to grow and an observation illumination for illuminating the plant when a user observes the inside of the heat shield chamber, and the plant growing illumination and the observation illumination can be individually controlled.

16. The germination/growing apparatus according to claim 1, further comprising:
    a humidifier for humidifying the inside of the heat shield chamber;
    a water supplier for supplying water to the seed or the plant;
    a timer for obtaining time information;
    a memory configured to store a plurality of control patterns composed of one or plural time points and a control condition corresponding to each of the time points;
    a selector for allowing a user to select an appropriate control pattern among the plurality of control patterns; and
    a controller for reading out the selected control pattern from the memory, and controlling, in accordance with the control pattern, at least one among the temperature controller, the illuminator, the humidifier, and the water supplier.

17. The germination/growing apparatus according to claim 15 wherein:

the illuminator comprises a plant growing illumination for supplying a light necessary for the plant to grow and an observation illumination for illuminating the plant when a user observes the inside of the heat shield chamber, and the plant growing illumination and the observation illumination can be individually controlled.

18. The germination/growing apparatus according to claim 1, wherein the breath inlet comprises:

a hole that opens to an inside of the heat shield chamber; and a tubular member configured to be insertable into the hole.

19. The germination/growing apparatus according to claim 18, wherein the breath inlet further comprises a valve or a cap, provided on a side of the hole, for opening and closing the hole.

20. A plant cultivation device for kitchen gardens for containing a seed or a plant to germinate or grow the seed or the plant, comprising:

a plant surrounding portion for surrounding the seed or the plant; and a breath inlet for receiving a human breath to a space formed by the plant surrounding portion, the breath inlet configured to be closed except when the human breath is applied to the breath inlet.

* * * * *